United States Patent
Ridder et al.

(10) Patent No.: US 8,324,862 B2
(45) Date of Patent: Dec. 4, 2012

(54) CHARGE REDISTRIBUTION CIRCUIT

(75) Inventors: Matthias Ridder, Eckental (DE);
Andreas Schwendinger, Übersee (DE);
Manfred Malik, Penzberg (DE)

(73) Assignee: Conti Temic Microelectronic GmbH, Numburg (DE)

( * ) Notice: Subject to any disclaimer, the term of this patent is extended or adjusted under 35 U.S.C. 154(b) by 436 days.

(21) Appl. No.: 11/793,963

(22) PCT Filed: Nov. 30, 2005

(86) PCT No.: PCT/DE2005/002155
§ 371 (c)(1),
(2), (4) Date: Nov. 28, 2007

(87) PCT Pub. No.: WO2006/066527
PCT Pub. Date: Jun. 29, 2006

(65) Prior Publication Data
US 2008/0197806 A1    Aug. 21, 2008

(30) Foreign Application Priority Data
Dec. 23, 2004 (DE) .................... 10 2004 062 186

(51) Int. Cl.
*H02J 7/00* (2006.01)
(52) U.S. Cl. ........ 320/118; 320/116; 320/119; 320/122; 320/134; 320/136
(58) Field of Classification Search .................. 320/118, 320/134
See application file for complete search history.

(56) References Cited

U.S. PATENT DOCUMENTS

| | | | | |
|---|---|---|---|---|
| 5,932,932 | A * | 8/1999 | Agatsuma et al. | 307/10.6 |
| 6,163,131 | A | 12/2000 | Gartstein et al. | |
| 6,316,917 | B1 * | 11/2001 | Ohta | 320/166 |
| 6,621,247 | B1 | 9/2003 | Bulling et al. | |
| 2003/0214267 | A1 * | 11/2003 | Long | 320/116 |
| 2004/0135546 | A1 * | 7/2004 | Chertok et al. | 320/118 |
| 2004/0164706 | A1 * | 8/2004 | Osborne | 320/116 |
| 2005/0024015 | A1 * | 2/2005 | Houldsworth et al. | 320/119 |
| 2005/0057219 | A1 * | 3/2005 | Kaminski et al. | 320/116 |
| 2005/0269988 | A1 * | 12/2005 | Thrap | 320/116 |

FOREIGN PATENT DOCUMENTS

| | | |
|---|---|---|
| EP | 0432639 A2 | 6/1990 |
| EP | 1283580 A2 | 7/2002 |
| JP | 2002010510 | 1/2002 |
| JP | 2003232159 | 8/2003 |
| WO | 2004/097868 | 11/2004 |

* cited by examiner

Primary Examiner — Edward Tso
Assistant Examiner — Ahmed Omar (57) ABSTRACT

A charge redistribution circuit (2) for an energy storage unit (1) with several storage elements (4) which are connected in series comprises several charge redistribution control units (5) for monitoring and redistributing the load, each of which is assigned an energy storage sub-group (3) of storage elements (4). The charge redistribution control units (5) take the energy used for their own supply in each case from the sub-group (3) assigned to them, and are thus supplied with a voltage which is higher than the voltage of the individual storage element (4) and lower than the voltage of the energy storage unit (1). The charge redistribution circuit (2) is established in such a manner that a monitoring and—when necessary a charge redistribution is achieved for each individual storage element (4).

12 Claims, 6 Drawing Sheets

CHARGE REDISTRIBUTION CIRCUIT

FIELD OF THE INVENTION

The invention relates in general to the storage of electric energy, and as an example to a charge redistribution circuit for an energy storage unit with several storage elements which are connected in series, whereby the charge redistribution circuit comprises several charge redistribution control units for monitoring the voltage and redistributing the charge, each of which is assigned an energy storage unit sub-group of storage elements. The invention also relates to an energy storage unit which is equipped with this circuit, and to a vehicle drive system which is equipped with an energy storage unit of this type.

BACKGROUND TO THE INVENTION

Storage units for electric energy are usually constructed from individual storage elements. The nominal operating voltage of these storage elements is usually at relatively low voltage levels, e.g. in the range of 2 to 2.5 V with Ultracap capacitors. For most applications, however, a far higher operating voltage is required for the energy storage unit. For example, the electric drives of hybrid motor vehicles, depending on the type, are operated at 48 V to 300 V, so that an energy storage unit used to feed a drive of this type needs to have a correspondingly high operating voltage. In order to achieve this high voltage level, with energy storage units, a corresponding number of storage elements is typically connected in series. For example, a 48 V energy storage unit can be formed by a series circuit of 20 Ultracap capacitors with a nominal operating voltage of approx. 2.5 V.

In the interim, it has become known that the service life of energy storage units of this type, which are constructed from a series circuit of a relatively large number of individual storage elements, is significantly shortened due to inhomogeneities in the charge condition of the individual storage elements (as cited for example in H. Schmidt et al., "The charge equalizer—a new system to extend battery lifetime in photovoltaic systems, U.P.S. and electric vehicles", International Telecommunications Energy Conference, Intelec, Paris, 27 to 30 Sep. 1993, IEEE, vol. 3, Cord 115, pp. 146-151). Previously, it had been assumed that with a series circuit of individual storage elements, all of these elements had identical properties, and were always in the same charge condition. In fact, however, each storage element has individual parameters (such as capacity, self-discharging rate), which generally deviate slightly from those of the other elements. With a simple series circuit, differences of this kind can on the one hand—with discharging procedures—lead to low discharging or even inverse charging of storage elements with a low level capacity, while on the other hand—with charging procedures—leading to overcharging of storage elements which have been fully charged too early. This behaviour is generally divergent, i.e. even small differences between the individual storage elements lead in the course of time to the events listed above, when only a sufficiently high number of charging/discharging cycles is completed. The events described above initially lead to damage or failure of the affected storage element, and can finally—as a type of chain reaction—lead to the premature failure of the entire energy storage unit.

In order to avoid effects of this nature from differences (which are unavoidable in practise) between individual storage elements, several authors have already suggested different methods with which an enforced symmeterisation of the charging condition of the individual storage elements is conducted, such as Schmidt et al. in the conference contribution mentioned above and in EP 0 432 639 A2, N. Kutkut et al. in "Dynamic equalization techniques for series battery stacks", Telecommunications Energy Conference 1996 (Intelec), Boston, 6 to 10 Oct. 1996, IEEE 0-7803-3507-4196, pp. 514-521, and Ridder in EP 1 283 580 A2. These suggestions share the basic concept of monitoring the voltage in the storage elements, and to remove a charge from higher charged storage elements and/or to feed a charge to storage elements which have a lower charge (whereby with some of the suggestions, a charge is removed from or fed to all storage elements, although more is removed from the higher charged elements, or less is fed to them than to the lower charged elements). According to Schmidt, a method is also known of forming sub-groups with storage elements which are connected in series, and of monitoring and symmeterising these as a unit (instead of all storage elements individually) in the manner described. While with earlier suggestions (which are reported by Schmidt, for example, in the conference paper mentioned above), the energy removed from the higher charge storage elements was dissipated in heat resistances, according to more recent suggestions, the removed energy is fed back to the energy storage unit (i.e. in effect, to the other storage elements), or alternatively, the energy fed to the lower charged storage elements is removed from the energy storage unit (i.e. in effect, from the other storage elements). A re-storage of this nature is more advantageous in terms of the efficiency, since in this way, it is not the entire re-stored energy which is lost, but only the losses entailed by the re-storing procedure. With these more recent suggestions, the service life of energy storage units of the type described above can be significantly extended—while maintaining a relatively high degree of efficiency.

As far as can be seen, however, the above mentioned publications provide no information as to how the charge redistribution circuit which is used for symmeterisation can itself be supplied with current. Presumably, the authors of the documents mentioned above intended the charge redistribution circuit to be supplied with the current required for its operation either from an external current source, or from the energy storage unit to be symmeterised itself. Elsewhere, a suggestion has already been made in another context of equipping individual battery cells with a control device which obtains its operating current from the battery cell to be monitored (U.S. Pat. No. 6,163,131). With a battery diagnosis device with measuring modules for one individual battery cell respectively, or—alternatively—for one group of battery cells respectively, it has also been suggested that this measuring module draw its operating current in each case from the monitored cell, or the monitored group of cells (DE 199 21 675 A1).

Overall, with a charge redistribution circuit which selectively removes or feeds a charge from or to individual storage elements or groups of storage elements (e.g. according to FIG. 5 of the above mentioned conference contribution made by Schmidt), a functioning voltage symmeterisation can be conducted. However, this circuit offered by Schmidt, for example, is rather expensive to produce. The object of the present invention is therefore, based on this prior art, for example, to provide a relatively simple charge redistribution circuit which enables a voltage symmeterisation of the storage elements of an energy storage unit.

SUMMARY OF THE INVENTION

The invention provides a charge redistribution circuit for an energy storage unit with several storage elements which are connected in series. The charge redistribution circuit comprises several charge redistribution control units for monitoring the voltage and redistributing the charge. The charge redistribution control units are each assigned one energy storage sub-group of storage elements. These take the energy used for their own supply from their respectively assigned sub-group. They are thus supplied with a voltage which is greater than the voltage of one individual storage element, and less than the voltage of the energy storage unit. The charge redistribution circuit is set up in such a manner that a voltage monitoring and—when required—a charge redistribution is conducted for each individual storage element.

According to a further aspect, the invention is oriented towards an energy storage unit with a charge redistribution circuit of the type named above.

According to a further aspect, the invention is oriented towards a drive system for a motor vehicle which for drive purposes comprises a combustion engine and an electric machine, and which is equipped with a charge redistribution circuit or with an energy storage unit of the type named above in order to feed the electric machine.

Further features are contained in the devices disclosed, or will be apparent to readers skilled in the art from the following detailed description of embodiments and the appended drawings.

BRIEF DESCRIPTION OF THE DRAWING

Embodiments of the invention will now be described below using examples and with reference to the appended drawing, in which.

In the figures, parts with the same function are assigned the same reference numerals.

DESCRIPTION OF THE PREFERRED EMBODIMENTS

Before the Figures are explained in greater detail, several comments are first given with regard to the preferred embodiments.

The embodiments relate to an energy storage unit with several storage elements which are connected in series. These may be galvanic cells, for example, or capacitors, Ultracap capacitors etc. The reason for the series connection of the storage elements is—as is generally the case—the fact that the energy storage unit, when regarded as a whole, is required to supply a higher nominal operating voltage than that of an individual storage element. For example, an energy storage unit with 20 2.5 V storage elements which are connected in series supplies a voltage of approx. 48-50 V. Naturally, an individual storage element can be formed of several sub-elements by means of a parallel circuit; this type is referred to in this description as a "storage element", regardless of its inner structure.

As has been explained in the introduction, with a pure series circuit (without charge compensation between the individual storage elements), the unavoidable differences between the individual storage elements would lead to uneven charging conditions. With the embodiments, a charge redistribution circuit is therefore provided which is suitable for enforced voltage symmeterisation of the storage elements which are connected in series. This charge redistribution circuit is constructed of several charge redistribution control units for monitoring the voltage and redistributing the charge. With the embodiments, these charge redistribution control units draw the energy required for their own supply from the energy storage unit itself.

With several embodiments, the core of the charge redistribution control units is in each case a microcontroller which controls the different functions of the charge redistribution control unit, i.e. in particular the voltage monitoring and voltage symmeterisation. Different standard microcontrollers operate with supply voltages which exceed the nominal operating voltage of different types of storage elements. Different microcontrollers accept broader ranges of supply voltages, which with some embodiments may incorporate the nominal operating voltage of the storage elements, although at the same time, the nominal operating voltage is frequently at the lower end of the microcontroller supply voltage range. For example, microcontrollers from the PIC10F series from Microchip Technology Inc. operate with a supply voltage in the range of 2.0 to 5.5 V, while nowadays, standard Ultracap capacitors have e.g. a nominal operating voltage of 2.5 V, i.e. an operating voltage which lies at a lower range end. When discharging an Ultracap storage element of this type, the voltage discharged from it would therefore very quickly fall below the lower limit of the operating voltage range of the microcontroller. With some of the embodiments, a charge redistribution control unit is therefore not assigned in each case to an individual storage element, but to a sub-group of several storage elements. Each charge redistribution control unit obtains with these embodiments the energy required for its own supply from the respectively assigned sub-group. The charge redistribution control unit is in this manner supplied with a voltage which is greater than the voltage of the individual storage element, and—since this is only a sub-group of the energy storage unit, but not the entire energy storage unit—which is less than the overall voltage of the energy storage unit. With the embodiments, this voltage is the total of the voltages of the individual storage elements which are assigned to the charge redistribution control unit, i.e. they are connected in series. With some embodiments, a charge redistribution control unit is in each case assigned to precisely two storage elements which are connected in series. For example, if these are two Ultracap capacitors with an operating voltage of 2.5 V, the charge redistribution control units—when the storage elements are fully charged—are supplied with a voltage of 5.0 V. In this way, a relatively extensive discharge (e.g. down to approx. 40% of the full charge) can take place, until the level falls below the lower limit of the supply voltage range (in the above example, 2.0 V).

On the other hand, with the embodiments it is not the case that the sub-groups represent the smallest rechargeable storage units which are monitored by the charge redistribution circuit (e.g. for voltage symmeterisation purposes), which would be the case for example were the charge redistribution control units to regard their respectively assigned sub-groups as a "black box", as is the case in the prior art. It is far more the case that the charge redistribution circuit is set up in such a manner that monitoring and—when required—a charge redistribution with each individual storage element of the sub-groups which is connected in series is conducted by the respective charge redistribution control unit.

With the embodiments, a situation is therefore achieved whereby on the one hand, the charge redistribution control units are supplied with suitably high supply voltages from the energy storage unit, while on the other hand, however, any voltage asymmetries are also avoided within the energy storage sub-groups which are used for this supply. Due to the supply with a suitable voltage from sub-groups, the charge redistribution control units do not need to provided a high or low setting of their supply voltage; the former would for example be the case with a supply from individual storage elements, while the latter would be the case with a supply from the entire energy storage unit. With some embodiments at least, the charge redistribution control units are therefore not equipped with a supply voltage converter.

With some embodiments, the charge redistribution is achieved in such a manner that e.g. for the purpose of voltage symmeterisation, a charge is redistributed on the one hand between the storage elements which belong to a sub-group, and on the other, between the energy storage sub-groups. With some of these embodiments, the charge redistribution control units are for this purpose equipped on the one hand with voltage converters which are internal to the sub-groups and are assigned to the individual storage elements for charge exchange purposes among the storage elements, and on the other, for charge exchange purposes between sub-groups, with one voltage converter which is in each case assigned to the entire affected sub-group.

As has been mentioned in the introduction, a voltage symmeterisation can in principle be achieved either be removing energy from storage elements or sub-groups with a relatively high voltage level, or by feeding energy into storage elements or sub-groups with a relatively low voltage level. Naturally, it is also possible to provide both as optional alternatives. Accordingly, with some embodiments, the voltage converters are designed as bidirectional voltage converters, which can remove or feed energy as required from or to the respectively assigned storage element or the assigned sub-group. With other embodiments, however, only one of these options is realised; in this way, with some embodiments for voltage symmeterisation, energy is removed from storage elements or sub-groups whose voltage level is relatively high. The latter measure is generally sufficient for the desired increase in service life, since it helps to avoid excessive voltages, which are particularly detrimental to the service life, when the storage elements are fully charged. "Relatively high" means for example "above a pre-specified limit value" or, with other embodiments, "by a (relative or absolute) value above the average of the measured voltages of the storage elements or sub-groups".

With some embodiments, the energy removed from a sub-group for voltage symmeterisation purposes is fed to the other sub-group(s). This can for example be achieved by means of feeding this energy to the entire energy storage unit (i.e. the entire series circuit of storage elements). A feed of this nature naturally also causes in turn a slight charge increase with the sub-group whose voltage actually needs to be reduced. Since this contribution is however "diluted" by a factor which corresponds to the inverse number of sub-groups, overall, a charge reduction remains for the sub-group in question, so that these different energy flows can be regarded in such a way as if a removed net energy amount would be fed only to the other sub-groups. Accordingly, with some of the embodiments, the voltage symmeterisation of one or more of the storage elements in the sub-group is achieved in such a manner that the energy removed from a storage element of a sub-group is fed to the other storage element(s) of the sub-group.

As has already been mentioned above, the storage elements are for example galvanic elements, capacitors or Ultracap capacitors. Galvanic elements store the energy in chemical form. As a result, relatively high energy densities can be achieved, while on the other hand, the conversion of chemical energy to electrical energy entails losses and can in general be relatively slow, so that only relatively low capacities can be taken in relation to the entire quantity of energy which can be stored. In addition, the speed of the conversion is generally reduced as the temperature sinks, and furthermore, the service life of electro-chemical batteries of this type is restricted. By contrast, capacitors store the energy directly in electrical form, so that it can be taken with practically no losses or delays, and as frequently as required. However, the energy density with standard capacitors is relatively low (typically 0.01 Wh/kg with electrolyte capacitors). So-called Ultracap capacitors have the advantages of standard capacitors (almost loss-free, fast and frequent de-chargeability), but achieve significantly higher energy densities. These are for example one or two sizes greater than those of aluminium electrolyte capacitors. With these capacitors, the storage mechanism is based on the movement of ions in the electric field (and not only on the polarisation of ions as is the case with standard capacitors with dielectric). The charge/discharge of an electro-chemical double layer is achieved (the Ultracap capacitors are therefore also known as double-layer capacitors). This layer comprises two phases: for example, electrically conducting carbon on the one side, and ions which are dissolved in a solvent on the other. During charging and discharging, the ions are attracted or repelled by the polarised carbon electrodes. Since the distance of the charge carriers is generally only a few nanometers, and the surface of carbon materials of this nature is very large, relatively high capacities can be achieved with low volumes (see e.g. T. Dietrich: UltraCaps—Power für innovative Automobilapplikationen ("Ultracaps—Power for innovative automobile applications"), in A. Krappel (publisher):

Kurbelwellenstartgenerator (KSG)—Basis für zukünftige Fahrzeugkonzepte (Crankshaft Start Generators, CSG,—the basis for future vehicle concepts), $2^{nd}$ edition, published by Expert 2000, p. 202-207).

With some of the embodiments, an energy storage sub-group, as has been mentioned, comprises in each case two storage elements. Although, depending on the storage element type used and the required supply voltage for the charge redistribution control units, the sub-groups can also be structured differently (e.g. each with three storage elements), two storage elements in each case permit a particularly simple twin construction. If, as with some of the embodiments, the storage elements comprise current connections to opposite sides, the two storage elements in a twin arrangement can be compiled with opposite orientation with regard to the polarity of the current connections. The two current connections of the twin arrangement on one side (such as the minus pole of the one storage element and the plus pole of the other storage element) are electrically through-connected with some of these embodiments. The current connections of the twin arrangement on the other side (i.e. with the above-mentioned example, the plus pole of the first storage element and the minus pole of the second storage element) form the outward "connection terminals" of the sub-group, and are connected in series with corresponding current connections from the other sub-groups. With some embodiments, the charge redistribution control units are in each case electrically connected with the above-mentioned connection terminals and the through-connected current connections.

An exemplary and preferred use of the above-mentioned charge redistribution circuit is achieved with a motor vehicle which for drive purposes comprises a combustion engine and an electrical machine, and which in order to feed the electrical machine is equipped with an energy storage unit and a charge redistribution circuit in accordance with the embodiments mentioned above.

Figure 1:
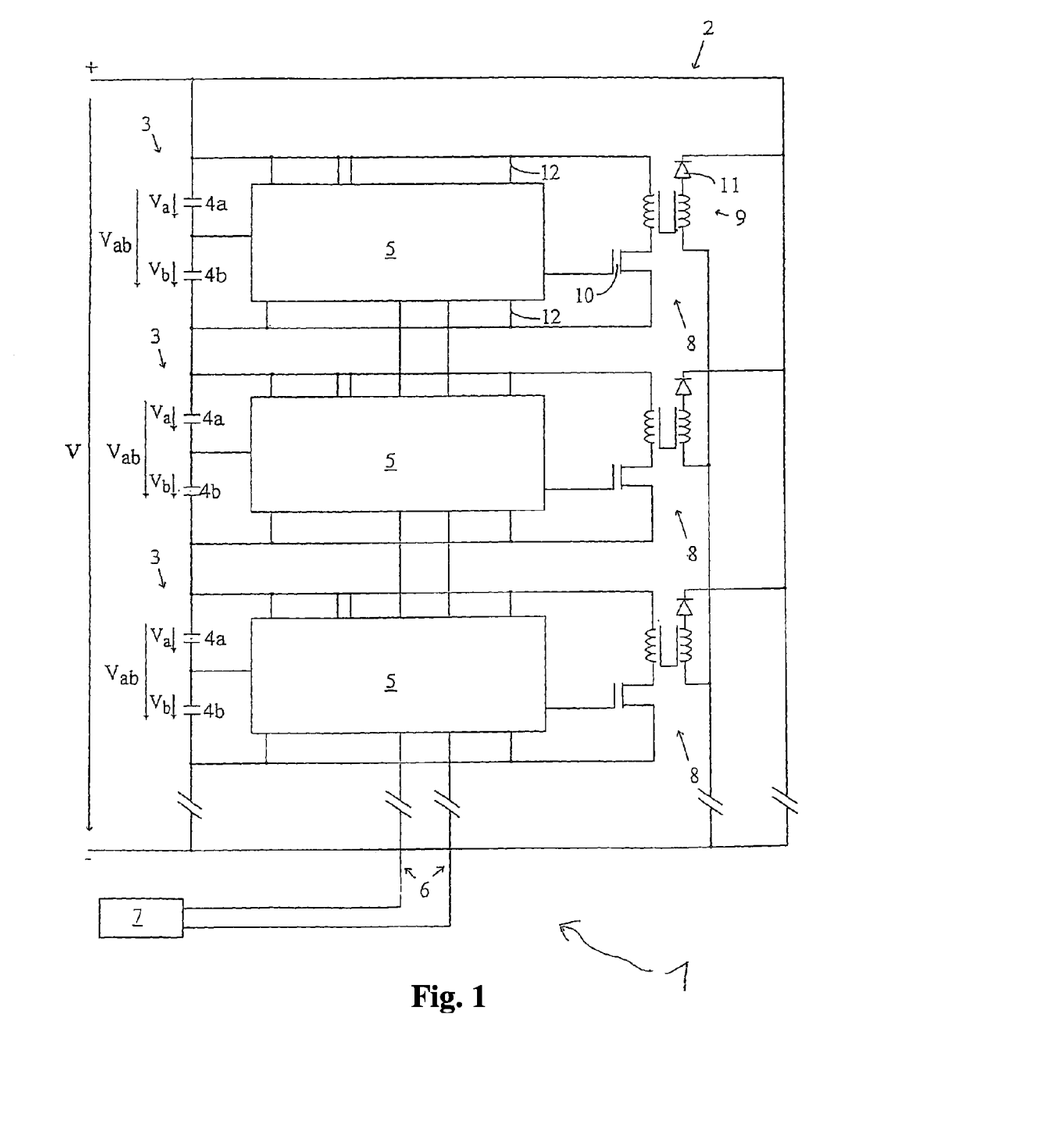
FIG. 1 shows a view of an energy storage unit with an embodiment of a charge redistribution circuit, in which the charge redistribution control units are shown schematically.

To return to FIG. 1, a section of an energy storage unit 1 is shown with a charge redistribution circuit 2. The energy storage unit 1 is formed by a series circuit of several energy storage sub-groups 3 (of which three are shown in FIG. 1). Each of these sub-groups 3 is in turn constructed of a series circuit of two storage elements 4, whereby in FIG. 1, each higher positioned storage element is designated as "4a", and each lower positioned storage element is designated as "4b". The voltage of the storage elements 4 is designated as $V_a$ or $V_b$. The voltage of the entire energy storage unit, which is the total of the voltages $V_{ab}$ is designated as V. The storage elements 4 can for example be Ultracap capacitors which have a nominal operating voltage $V_a$ or $V_b$ of 2.5 V. The sub-groups 3 therefore in this example each have a nominal operating voltage $V_{ab}$ of 5.0 V. For example, if one assumes that the energy storage unit 1 comprises ten sub-groups 3 which are connected in series, the nominal overall operating voltage V of the energy storage unit 1 therefore constitutes 50 V.

Each energy storage sub-group 3 is assigned a charge redistribution control unit 5. The charge redistribution control units 5 measure in each case the current voltage $V_{ab}$ of the assigned energy storage sub-group 3 as an input value (as further input values, they also measure the current voltages $V_a$ and $V_b$ of the storage elements 4 which belong to the respective sub-group—this is explained in greater detail below in connection with FIG. 2). All charge redistribution control units 5 also have a communication connection via a control bus 6 with an upstream control unit 7. The charge redistribution control units 5 continuously report to the control unit 7 e.g. the current voltage $V_{ab}$ measured by them of the respective assigned sub-group 3.

With some embodiments, an internal voltage threshold value is stored as a fixed value in each charge redistribution control unit 5. Those charge redistribution control units 5 for which the voltage $V_a$ or $V_b$ of an individual storage element 4 exceeds this voltage threshold value conduct an internal voltage symmeterisation for a sub-group by redistributing the charge within the sub-group 3.

In addition, those charge redistribution control units 5 for which the assigned sub-group voltage $V_{ab}$ exceeds the voltage threshold value by n times conduct a voltage symmeterisation between the sub-groups 3 by removing the charge from its own sub-group 3 (whereby n is the number of storage elements 4 connected in series in a sub-group 3; in the present example with two storage elements 4 per sub-group 3, this is therefore double the voltage threshold value).

The charge redistribution control units 5 can conduct this symmeterisation activity autonomously, i.e. independently of the control unit 7 due to the internal voltage threshold value. With other embodiments, the voltage threshold value is by contrast not stored as a fixed value in the charge redistribution control units 5, but instead is specified to them by the upstream control unit 7 via the control bus 6; this specified value is then only stored temporarily in the charge redistribution control units 5 (e.g. only for a fixed limited maximum period and/or until it is again overwritten by the voltage threshold value reported by the control unit 7). With embodiments of this type, the control unit 7 therefore determines from which level onwards any voltage asymmetries should be removed. With further embodiments, both types of threshold value implementation are combined, whereby the charge redistribution control units 5 have both an internal threshold value which is stored as a fixed value, as well as receiving a threshold value which is specified by the control unit 7; during operation, they then use one of these threshold values to decide whether a threshold value has been exceeded (e.g. they use the lower of the two threshold values. A combination of this nature permits on the one hand an influencing of the symmetry activity by the upstream control unit 7, while on the other also enabling the charge redistribution circuit 2 to function on the basis of fully autonomously acting charge redistribution control units 5 when the control unit 7 is not in operation, or when the communication connection via the control bus 6 is interrupted and no threshold value is therefore available which has been specified by the control unit 7.

With some of the embodiments, the same threshold value is stored as a fixed value in all charge redistribution control units 5; accordingly, with these embodiments, the upstream control unit 7 also specifies a shared threshold value for all charge redistribution control units 5.

In order to remove excess charge, each sub-group 3 is equipped with a boost converter (i.e. a d.c. voltage converter which increases the voltage), which is able to reduce the voltage $V_{ab}$ of each assigned sub-group 3 overall (but not the voltages $V_a$ or $V_b$ selectively of the individual storage elements 4 of the sub-group 3, however), and which is thus referred to below as the sub-group converter 8.

On the input side, the sub-group converters 8 are in each case connected parallel to the corresponding sub-group 3; therefore, the respective sub-group voltage $V_{ab}$ is present on their input. On the output side, the sub-group converters 8 are connected in parallel with each other with the connections of the overall energy storage unit 1; therefore, the—significantly higher—overall voltage V is present on their output. If the voltage of a sub-group 3 needs to be reduced, the affected charge redistribution control unit 5 triggers its sub-group converter 8 in such a manner that it pumps charges from the sub-group 3 to the output side under a voltage boost, and in this way, feeds it to the entire energy storage unit 1. As a result, the removed charged is distributed evenly among all sub-groups 3 of the energy storage unit 1, so that the voltage $V_{ab}$ of the affected sub-group 3 is reduced relative to the sub-group voltages $V_{ab}$ of the other sub-groups 3. This is achieved for example using a hysteresis until a second, lower threshold value is not reached. Due to this pumping off of charges from sub-groups for which the voltage is too high and the feeding back of charges into the overall energy storage unit 1, a voltage symmeterisation of the sub-group 3 is achieved.

For the sub-group converter 8, each suitable type of boost converter can be used. In the exemplary embodiment shown in FIG. 1, a blocking converter is provided for this purpose which is formed by a transformer 9, the primary coil of which is connected in series with a switch 10 (here a power transistor) and the secondary coil of which is connected in series with a return flow inhibitor 11 with a through flow direction to the positive connection of the energy storage unit 1 (here a diode). Due to self-induction, closing or opening the switch 10 leads to an induced voltage on the secondary side of the transformer 9, and this in turn leads to a current flow through the return flow inhibitor 11 on the higher voltage level V of the energy storage unit 1. Opening and closing the switch 10 is caused by triggering on the part of the charge redistribution control unit 5.

In order to provide its own current, the charge redistribution control unit 5 is connected with current supply connections 12 to the positive or negative pole of the corresponding energy storage sub-group 3. The charge redistribution control units 5 therefore draw their own operating current from the respectively assigned sub-group 3, and with the sub-group voltage $V_{ab}$. The tapping shown in the circuit in FIG. 1 in each case between the storage elements of a sub-group 3 is used to measure and symmeterise the voltage of the affected storage elements 4 of a sub-group 3 among each other (as explained below with reference to FIG. 2), however, not of the current supply to the charge redistribution control unit 5.

Figure 2A:
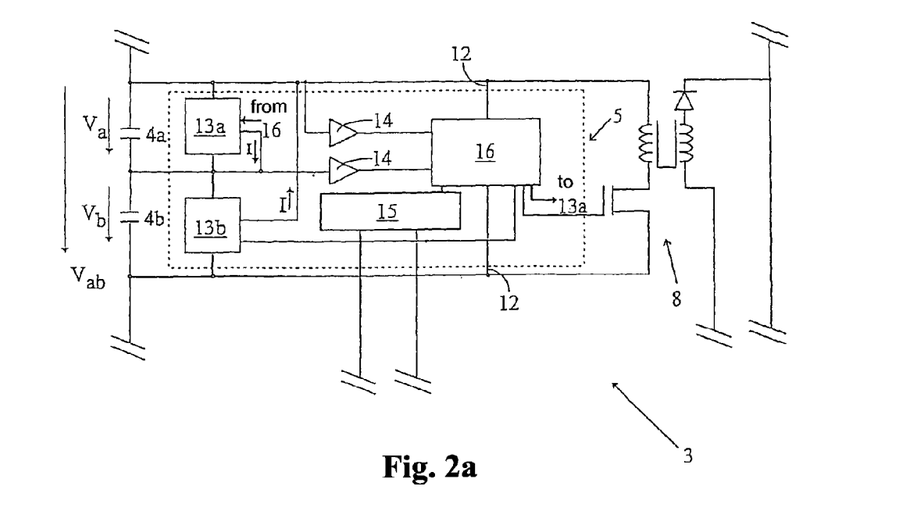
FIG. 2 shows a more detailed view of a charge redistribution control unit of FIG. 1.
Figure 2B:
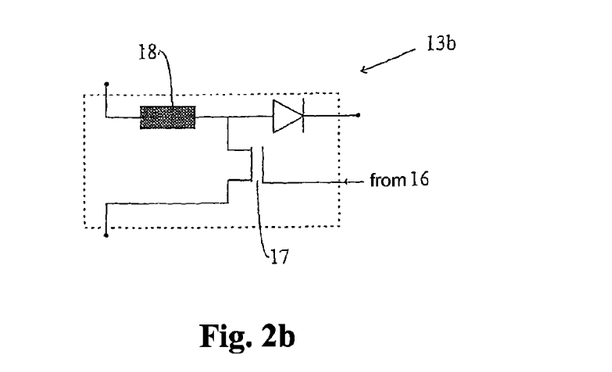

FIG. 2a shows an energy storage unit sub-group 3 from FIG. 1, in which the charge control unit 5 is shown in greater detail than in FIG. 1. It comprises two voltage converters 13a and 13b, two voltage amplifiers 14, a communication interface 15 and a microcontroller 16. The voltage converters 13a and 13b serve the charge redistribution within the sub-groups of the storage elements 4 of the sub-group 3 in question, and are thus also referred to below as "storage element converters". The storage elements converter 13a and 13b of a storage element 4a, 4b is connected with its output to the positive connection of the other respective storage element 4a or 4b. The storage element converters 13a and 13b are choke converters, whereby the upper storage element converter 13a is e.g. a voltage reducing converter, and the lower storage element converter 13b is e.g. a voltage boosting converter. A sample circuit for a voltage reducing choke converter 13b is shown schematically in FIG. 2b. In a similar manner as for the sub-group converters 8 described with reference to FIG. 1, with the storage element converters 13a and 13b, a charge is removed from the respective corresponding storage elements 4a, 4b, whereby in each case, a power switch 17 is activated in a clocked manner. This actuates by self-induction in a choke 18 a current flow by boosting or reducing the voltage. The triggering of the switch 17 is achieved—as with the switch 10—by the microcontroller 16. A corresponding circuit for the voltage reducing choke converter 13b is essentially attained e.g. in FIG. 2b by exchanging the switch 17 and the choke 18.

The microcontroller 16 continuously measures via the voltage measurement amplifier 14 the voltages $V_a$ and $V_b$ of the two storage elements 4a, 4b (more precisely, it measures in the embodiment shown in FIG. 2a the voltage $V_{ab}$ of the sub-group on the one hand, and the voltage $V_b$ of the lower storage element 4b on the other, and calculates from this by forming the difference ($V_a-V_b$) the voltage $V_a$ of the upper storage element 4). If the microcontroller 16 here determines a voltage difference between $V_a$ and $V_b$ which exceeds the above-mentioned first threshold value, it conducts an internal symmeterisation of the storage elements 4a, 4b of the sub-group 3. For this purpose, it clocks the power switch 17 of the storage element converter 13a or 13b which is assigned to the storage element 4a or 4b with the higher of the two voltages $V_a$ or $V_b$. As a result, a charge is removed from the affected storage element 4a or 4b and fed to the other storage element 4b or 4a of the same sub-group 3 (whereby in the case of a voltage boosting charge removal from the lower storage element 4b, this charge is fed to the entire sub-group 3, so that a part of this charge (i.e. approximately half) flows back into the lower storage element 4b. As a net effect, however, despite this "dilution", a charge removal results from the lower storage element 4b into the upper 4a). This symmeterisation is achieved for example using a hysteresis until a second, lower threshold value is not reached. The communication interface 15 serves as an interface of the microcontroller 16 to the control bus 6, and thus to the upstream control unit 7.

As was explained with reference to FIG. 1, the power supply to the charge redistribution control unit 5 is achieved via the power supply connections 12 from the corresponding energy storage sub-group 3 with their voltage $V_{ab}$. FIG. 2a shows as an example the feed of this supply voltage to the microcontroller 16. Corresponding feeds are naturally provided for the other components in the charge redistribution control unit 5, insofar as they require a power supply, e.g. for the voltage measurement amplifier 14 and the communication interface 15.

The first threshold value—which has already been explained with reference to FIG. 1—the exceeding of which triggers a symmeterisation of storage elements 4 within a group, is for example 0.1V above the nominal operating voltage of a storage element 4, i.e. it is 2.6V (with the Ultracap capacitors mentioned above with a nominal operating voltage of 2.5V). Accordingly, the double threshold value the exceeding of which triggers a symmeterisation of sub-groups 3 is 2.5V. With other embodiments, the nominal voltage is by contrast set itself as the threshold value; It thus constitutes 2.5V with the named example (or—when doubled—5.0V). As a result, any excess charge, i.e. a charge which exceeds the nominal operating voltage, is avoided. Should the energy storage unit 1 be charge to the extent that the respective other storage element 4 of a sub-group 3 or the other sub-groups 3 is/are unable to accept the charge to be removed, e.g. because its/their voltage also exceeds the threshold value, losses occur due to the currents which arise with the recharging attempts (and thus to dissipation of energy into heat), which finally lead overall to the required voltage removal.

The second threshold value—as already mentioned with reference to FIG. 1—lies somewhat below the first threshold value in order to create the hysteresis effect, e.g. around a fixed specified difference amount which can for example be 0.1V. With a first threshold value of e.g. 2.5V, a symmetry activity is thus again ended when the storage element voltage $V_a$ or $V_b$ does not reach a value of 2.4V or the sub-group voltage $V_{ab}$ does not reach a value of 4.8V.

Figure 3:
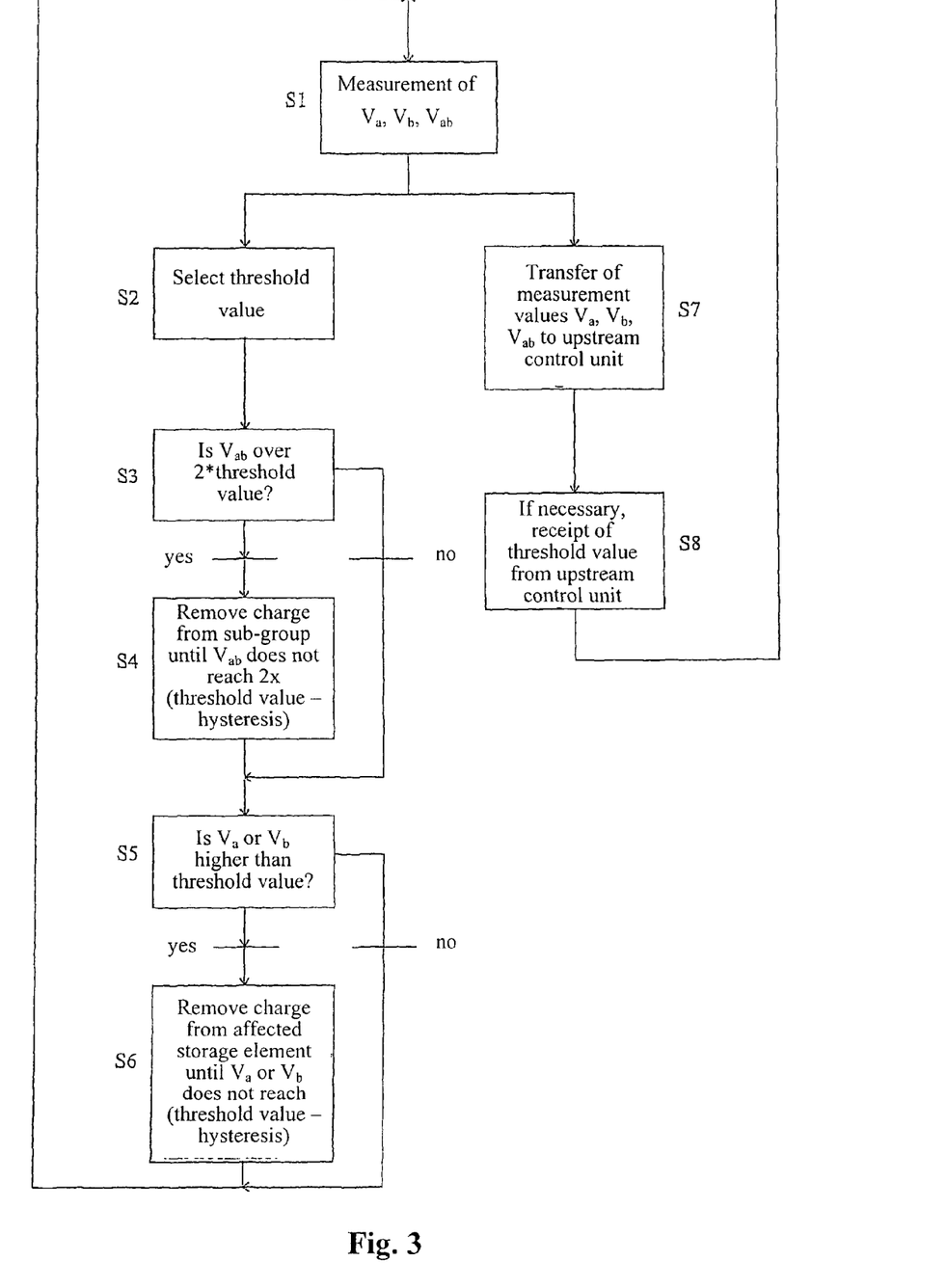
FIG. 3 shows a flow chart to clearly present the activity of a charge redistribution control unit.

FIG. 3 is a schematic flow chart of the activities conducted by a microcontroller 16 in each case of a sub-group 3. The sequence is conducted cyclically, i.e. it is not terminated. In the representation in FIG. 3, it begins with S1 with the measurement of the current voltage $V_{ab}$ of the corresponding sub-group 3 and the current voltages $V_a$, $V_b$ of the individual storage elements 4a, 4b which belong to the sub-group 3. As has already been mentioned above, here, not all of these voltage values (in the more precise sense) need to be measured; it is far more that case that with S1, the option is also available of calculating one of the named voltages (e.g. $V_a$) from the other measured values (e.g. according to $V_a=V_{ab}-V_b$). With S2, a voltage threshold value to be selected for the current cycle is chosen. This can be for example the minimum of a fixed stored internal threshold value and a temporarily stored threshold value specified by the control unit 7. With S3, the microcontroller 16 determines whether the measured voltage value $V_{ab}$ of the sub-group 3 which belongs to it lies above the threshold value which has been selected twice. If this is the case, with S4, it triggers the removal of charge from the above-mentioned sub-group 3 until the sub-group voltage $V_{ab}$ does not reach a suitable second threshold value (e.g. double the difference between the first threshold value selected with S2 and a hysteresis; for this purpose, with S4, $V_{ab}$ is measured continuously). However, if with S3, no exceeding of the double threshold value is determined, the charge removal is not conducted with S4. With S5, the microcontroller 16 checks whether the voltage $V_a$ or $V_b$ of the individual storage elements 4 of the sub-group 3 assigned to it lies above the threshold value selected with S2. If this is the case, with S6 it removes charge from the affected storage element (e.g. 4a) and into the other storage element (e.g. 4b) of the same sub-group 3 until the affected voltage (e.g. $10V_a$) does not reach a suitable second threshold value (e.g. the difference between the above-mentioned first threshold value and a hysteresis; for this purpose, with S6, the affected voltage (e.g. $V_a$) is measured continuously). However, if with S5 no exceeding of the threshold voltage is determined, the charge redistribution is not conducted with S6. The sequence then continues cyclically with S1.

In a further process which runs in parallel to these symmetry activities, the microcontroller 16 forwards with S7 the measured voltages $V_{ab}$, $V_a$, $V_b$ of the sub-group 3 assigned to it to the upstream control unit 7. In addition, the microcontroller 16 is constantly ready to receive a new threshold value from the upstream control unit 7. This can for example be achieved in such a manner that the microcontroller 16 checks during the parallel process whether a new threshold value has been received; a threshold value of this nature then replaces the threshold value used until then which has been specified by the feeding unit 7 and which is used with S2 to S6. With other embodiments, other ways of receiving are implemented; for example, the microcontroller 16 can in the first process named above conduct a corresponding input check before S2 and if necessary, set a threshold value. After S8, the parallel process also returns to S1.

Figure 4A:
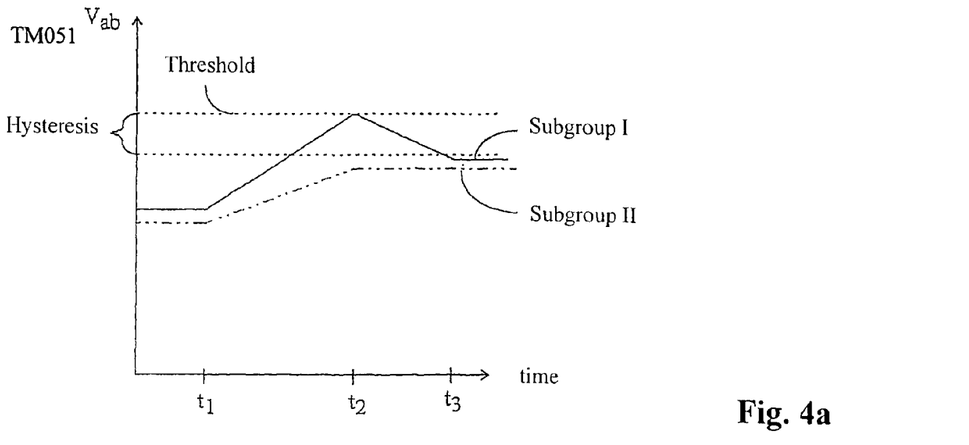
FIG. 4 shows schematic voltage progressions as a function of time, of energy storage sub-groups and of the individual storage elements before and during voltage symmeterisation procedures.
Figure 4B:
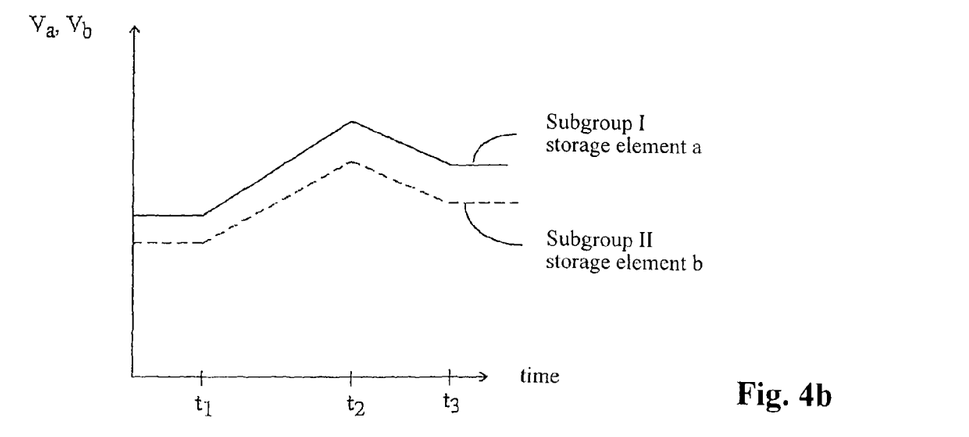

FIG. 4 shows in three different graphs the voltage progressions of two energy storage sub-groups 3 (called sub-groups I and II) and two storage elements 4 (called storage elements a and b) of one of the two sub-groups 3 (namely sub-group 1) as a function of time. FIG. 4a shows as an example that in the course of a charging procedure between time points $t_1$ and $t_2$, the voltage $V_{ab}$ of one of the sub-groups (i.e. sub-group I) increases more rapidly than that of the other sub-group (i.e. sub-group II). Accordingly, the voltages $V_a$ and $V_b$ of the storage elements 4a, 4b which belong to the same sub-group 3 can run in different directions. FIG. 4b thus shows as an example that during the charging procedure between $t_1$ and $t_2$ the voltage $V_a$—which here is already higher—of the first storage element 4a (here, the sub-group I which is tapped, for example), increases somewhat more rapidly than that of the first storage element 4a of this sub-group.

At the point in time $t_2$, the voltage $V_{ab}$ of the sub-group I exceeds the (first) threshold value in the example shown in FIG. 4a. This triggers the voltage symmeterisation procedure described above, in which the charge is removed from sub-group I and fed back into the overall energy storage unit 1. As a result, the voltage $V_{ab}$ of sub-group I decreases until at the point in time $t_3$ it does not reach the second threshold value (this is e.g. the difference between the first threshold value and a hysteresis), so that the symmeterisation procedure ends at $t_3$. Put precisely, the voltage $V_{ab}$ of the other sub-group (sub-group II) increases due to the charge return feed; due to its distribution to all sub-groups of the energy storage unit, this effect is strongly diluted and is therefore not reflected in the schematic view in FIG. 4a. In FIG. 4a, it is assumed for reasons of clarity that the charging procedure ends at the beginning of the symmeterisation procedure (i.e. at $t_2$; in actual fact, the charging can continue, thus overlapping with the symmeterisation procedure).

FIG. 4b shows that this voltage symmeterisation of the sub-groups among each other does not essentially have a symmeterisation effect on the individual storage elements within a sub-group. For this purpose, the ideal is assumed in FIG. 4b that a symmeterisation is conducted within a sub-group which is not simultaneous to the symmeterisation of sub-group I described above with FIG. 4a (in actual fact, the latter will in general be the case, since an excess of the (double) threshold value in the sub-group generally also leads to an excess of the (single) threshold value by at least one of the storage elements). Under this assumption, the absolute values of the voltages $V_a$ and $V_b$ of the individual storage elements decrease accordingly according to FIG. 4b while the charge is being removed from sub-group I between $t_2$ and $t_3$, however, their voltage difference essentially remains unchanged.

Figure 4C:
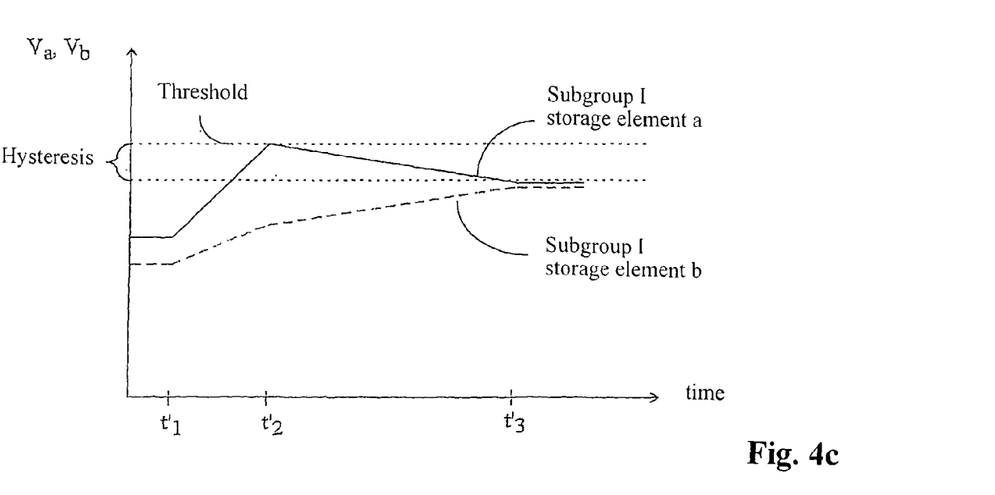

As has already been described above, the symmeterisation of the individual storage elements in a sub-group is conducted to a far greater extent in a symmeterisation process which is independent of this and which is internal to the sub-group, as shown in FIG. 4c. For reasons of clarity, it is assumed in FIG. 4c that in the time period $t'_1$ to $t'_3$ shown here, no simultaneous symmeterisation outside the sub-group is conducted of the type shown in FIG. 4a, in order to avoid showing an overlap of the two symmeterisation processes—as with FIG. 4b. It is assumed as an example here that between $t'_1$ and $t'_2$ a charge of the sub-group I under consideration here takes place, whereby the storage element a of this sub-group I exceeds the (first) threshold value at $t'_2$ (this can be half of the threshold value in FIG. 4a, for example). As a result of the exceeding of the threshold value, a charge is now removed from the storage element a and fed to the other storage element b of the sub-group I under consideration. Accordingly, the voltage $V_a$ of the storage element a decreases, and the voltage $V_b$ of the storage element b increases until at the point in time $t'_3$, the voltage $V_a$ does not reach a second threshold value (e.g. the first threshold value minus a hysteresis), at which point the voltage symmeterisation within the sub-group ends.

Figure 5:
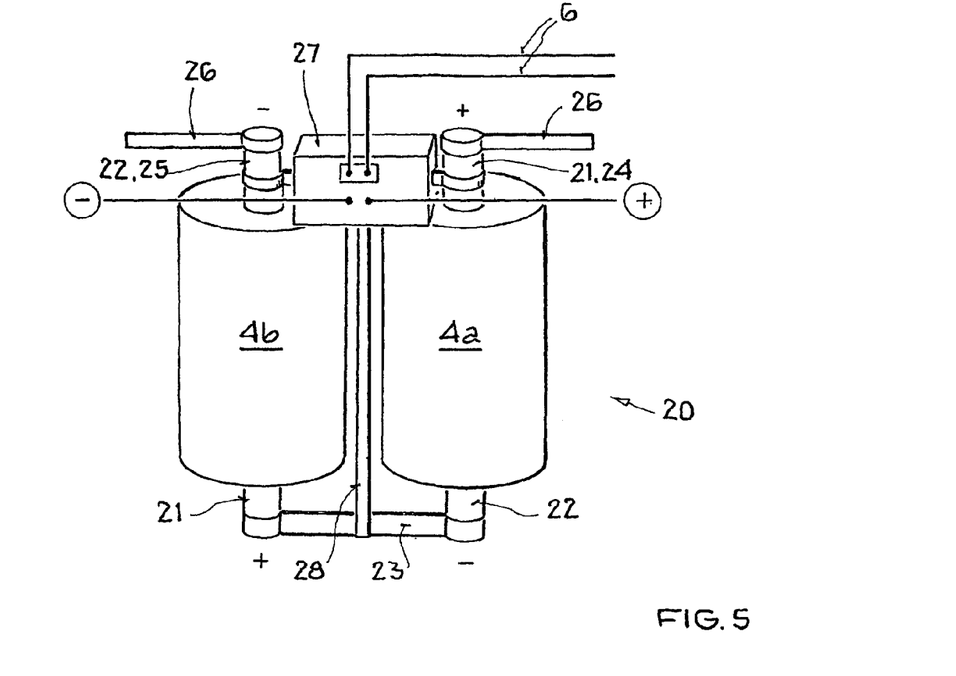
FIG. 5 shows a twin arrangement of storage elements which form a sub-group.

FIG. 5 shows a twin arrangement 20 of two storage elements 4, which can for example be Ultracap capacitors, the housing of which has an elongated cylindrical form with two e.g. circular front sides. The two storage elements 4 are arranged parallel to longitudinal axes of the housing cylinder which are positioned on a shared plane. On its longitudinal axis, the storage elements 4 comprise on each of the opposite front sides a positive current connection 21 or a negative current connection 22. The storage elements 4 are arranged with opposing orientation with regard to their polarities, i.e. on the adjacent front sides, a positive current connection 21 of one storage element 4 is positioned and a negative current connection 22 of the other storage element is positioned respectively. On one side, the two adjacent current connections 21, 22 are coupled with a connection line 23. The two storage elements thus form a sub-group 3 of two storage elements 4 according to the sub-groups shown in FIGS. 1 and 2 (and thus labelled "4a" and "4b"). The current connections 21 or 22 which are positioned on the other side form the positive or negative connection terminal 24 or 25 of this sub-group 3. They are in each case connected with connection strips 26 with further twin arrangements of the type shown. Between the two above-named connection terminals 24, 25, the section of a charge redistribution circuit of the type described above which is assigned to the sub-group 3 is arranged. This is therefore a charge redistribution control unit 5 and a sub-group converter 8 according to FIGS. 1 and 2. This partial circuit labelled "27" is connected on the one hand with the two connection terminals 24, 25 of the sub-group 3, and on the other, has a tap 28 of the potential between the two storage elements 4a, 4b which contacts the connection line 23 which lies on this potential (with other embodiments, in which the housing of the storage elements 4a, 4b lies on this interim potential, a connection can instead be provided to one or both of these housing units in order to tap the interim potential). The partial circuit 27 is also still connected with the positive and negative connection terminal of the entire energy storage unit, of which the twin arrangement 20 is a part. In addition, it is coupled with an upstream control unit via a control bus 6 for the communication connection.

Figure 6:
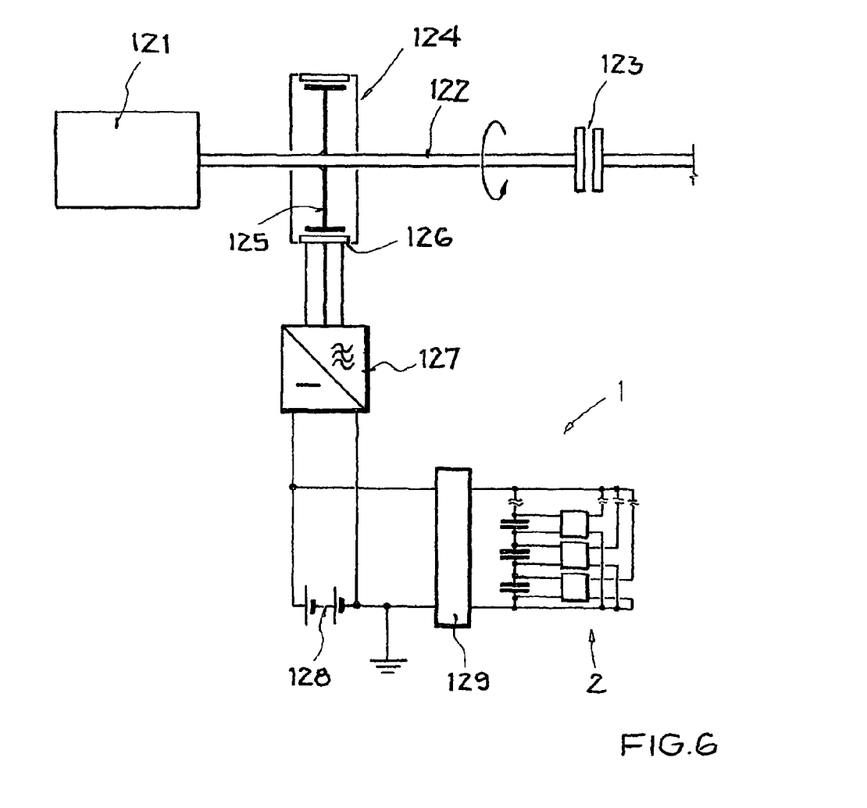
FIG. 6 shows a schematically simplified view of a motor vehicle drive system with an embodiment of the energy storage unit described.

FIG. 6 shows a motor vehicle drive system with an energy storage unit 1 and a charge redistribution circuit 2 according to FIGS. 1 to 5. The drive system comprises a combustion engine 121, which emits the torque via a drive shaft 122 (e.g. the crankshaft of a combustion engine 121), a clutch 123 and further parts (not shown) of a drive chain onto the drive wheels of the vehicle. On the drive shaft 122, an electrical machine 124 is positioned which acts as a starter and/or booster, and if necessary, as a generator; here, a rotary current asynchronous machine or a rotary current synchronous machine which is equipped e.g. with permanent magnets. It comprises runners 125 which sit directly on the drive shaft 122 and which are firmly connected with it, and stands 126 which are supported e.g. on the housing of the combustion engine 121. The electric machine 124 and the combustion engine 121 run permanently together; the combustion engine 121 and/or the boost function are started directly and without a transfer. The coil (not shown here) of the stand 126 is fed via an inverse rectifier 127 with electric currents and voltages of an amplitude, phase and frequency which can be freely selected. The inverse rectifier 127 generates these currents and voltages from a d.c. current input circuit, whereby a standard long-life battery 128 (e.g. a lead-sulphur rechargeable battery e.g. with 48V operating voltage) is arranged. The energy storage circuit 1 is also connected to the charge redistribution circuit 2 via the input circuit, i.e. via a charging/discharging control device 129 which also takes on the function of the upstream control unit 7 in FIG. 1. The energy storage unit 1 is, as shown in greater detail in FIG. 1, structured from energy storage sub-groups 3 which are connected in series, each with assigned partial symmeterisation circuits 27 (FIG. 6). The sub-groups 3 are in turn structured from storage elements which are connected in series, whereby in FIG. 6, in each case a sub-group of this type is represented by a capacitor symbol. When the electric machine 124 briefly requires a high level of electric power, e.g. for directly starting the combustion engine 121, or for boosting the torque when the vehicle is accelerated (boost function), a high level of electric power is briefly removed from the energy storage unit 1 and fed to the electric machine 124 via the inverse rectifier 127. The subsequent charging of the energy storage unit 1 is conducted during running operation, e.g. when the electric machine 124 operates as a generator. If the energy storage unit 1 should be discharged, e.g. after a long vehicle standstill, it can be charged from the long-life battery 128 before the starting procedure. The microcontrollers 16 of the charge redistribution control units 5 are no longer supplied when the energy storage unit 1 is fully discharged, and therefore cease to operate. They are designed in such a manner that following a return of the power supply—in the form of a reset—they resume their internal programme cycle from a specific point onwards. As a result, they are prevented from reaching an undefined operating state due to a discharge and later recharge of the energy storage unit 1. The symmeterisation of the energy storage unit 1 is achieved in accordance with the procedure described above with reference to FIGS. 1-4.

The preferred embodiments permit the charge symmeterisation of storage packs with a high overall degree of effectiveness and a relatively low level of constructional cost.

The invention claimed is:

1. A charge redistribution circuit for an energy storage unit (1) with several storage elements (4) which are connected in series, the circuit comprising:
two or more charge redistribution control units (5) for monitoring a voltage and redistributing a charge, and each control unit is assigned an energy sub-group (3) of a plurality of storage elements (4), wherein each of the charge redistribution control units use energy from the assigned sub-group as an energy supply, and are supplied with a voltage which is higher than the voltage of an individual storage element (4) and lower than the voltage of the energy storage unit (1), and the charge redistribution circuit (2) is established in such a manner that a voltage monitoring and—when necessary—a charge redistribution is achieved between individual storage elements (4) within the energy sub-group and wherein in order to distribute the charge among the storage elements (4), the charge redistribution control units (5) are equipped with voltage converters, internal to the sub-groups, which are assigned to the individual storage elements (4), and with a voltage converter (8) which is assigned in each case to one of the sub-groups (3) in order to redistribute the charge among the sub-groups to each other, wherein the charge redistribution is achieved in such a manner that the charge is distributed between the storage elements (4) which belong to a sub-group (3), and the charge is distributed among the energy storing sub-groups (3).

2. The charge redistribution circuit of claim 1, wherein the voltage that supplies a charge redistribution control unit (5) is a total of the voltages of the storage elements (4) assigned to it.

3. The charge redistribution circuit of claim 1, wherein which the supply of the charge redistribution control unit (5) is achieved by boosting or reducing the supplying voltage.

4. The charge redistribution circuit of claim 1, wherein the charge redistribution is achieved in such a way that the voltages of the energy storage sub-groups (3) and the storage elements (4) are symmetrised.

5. The charge redistribution circuit of claim 4, wherein energy is removed from energy storage sub-groups (3) and the storage elements (4) of which the voltage is relatively high.

6. The charge redistribution circuit of claim 5, wherein the energy removed from an energy storage sub-group (3) for voltage symmeterisation of the energy storage unit (1) is fed to the other sub-group(s) (3).

7. The charge redistribution circuit of claim 5, wherein the energy removed from one storage element (4) of a sub-group (3) for voltage symmeterisation of the sub-group (3) is fed to the other storage element(s) (4) of the sub-group (3).

8. The charge redistribution circuit of claim 1, wherein the storage elements (4) are Ultracap capacitors.

9. The charge redistribution circuit of claim 1, wherein the energy storage sub-groups (3) each comprise two storage elements (4).

10. An energy storing unit comprising:
an energy storage unit (1) with several storage elements (4) which are connected in series; and
a charge redistribution circuit having two or more charge redistribution control units (5) for monitoring a voltage and redistributing a charge, and each control unit is assigned an energy sub-group (3) of a plurality of storage elements (4), wherein each of the charge redistribution control units use energy from the assigned sub-group as an energy supply, and are supplied with a voltage which is higher than the voltage of an individual storage element (4) and lower than the voltage of the energy storage unit (1), and the charge redistribution circuit (2) is established in such a manner that a voltage monitoring and—when necessary—a charge redistribution is achieved between individual storage elements (4) within the energy sub-group and wherein in order to distribute the charge among the storage elements (4), the charge redistribution control units (5) are equipped with voltage converters, internal to the sub-groups, which are assigned to the individual storage elements (4), and with a voltage converter (8) which is assigned in each case to one of the sub-groups (3) in order to redistribute the charge among the sub-groups to each other, wherein the charge redistribution is achieved in such a manner that the charge is distributed between the storage elements (4) which belong to a sub-group (3), and the charge is distributed among the energy storing sub-groups (3).

11. The energy storing unit of claim 10, wherein the energy storage sub-groups (3) each comprise two storage elements (4); wherein the storage elements (4) comprise current connections (21, 22) on opposite sides, the two storage elements (4) which form a sub-group (3) are compiled in a twin arrangement (20) with opposite orientation with regard to the polarity of the current connections (21, 22), and the two current connections (21, 22) of the twin arrangement (20) are electrically through-connected on one side, the current connections (21,22) of the twin arrangement on the other side form the connection terminals (24, 25) of the sub-group (3), and are connected in series with corresponding current connections of the other sub-group(s) (3), and the charge redistribution control units (5) are in each case electrically connected with the connection terminals (24, 25) to the twin arrangement (20) and the through-connected current connections (21, 22).

12. A drive system for a vehicle comprising:
a combustion engine (121); and
an electric machine (124), wherein in order to supply the electric machine (124) is equipped with an energy storage unit (1) with a charge redistribution circuit (2) having two or more charge redistribution control units (5) for monitoring a voltage and redistributing a charge, and each control unit is assigned an energy sub-group (3) of a plurality of storage elements (4), wherein each of the charge redistribution control units use energy from the assigned sub-group as an energy supply, and are supplied with a voltage which is higher than the voltage of an individual storage element (4) and lower than the voltage of the energy storage unit (1), and the charge redistribution circuit (2) is established in such a manner that a voltage monitoring and—when necessary—a charge redistribution is achieved between individual storage elements (4) within the energy sub-group and wherein in order to distribute the charge among the storage elements (4), the charge redistribution control units (5) are equipped with voltage converters, internal to the sub-groups, which are assigned to the individual storage elements (4), and with a voltage converter (8) which is assigned in each case to one of the sub-groups (3) in order to redistribute the charge among the sub-groups to each other, wherein the charge redistribution is achieved in such a manner that the charge is distributed between the storage elements (4) which belong to a sub-group (3), and the charge is distributed among the energy storing sub-groups (3).

\* \* \* \* \*